United States Patent Office 3,565,635
Patented Feb. 23, 1971

3,565,635
SOLUBLE COFFEE
James P. Mahlmann, Wayne, N.J., assignor to General Foods Corporation, White Plains, N.Y., a corporation of Delaware
No Drawing. Filed July 31, 1968, Ser. No. 748,931
Int. Cl. A23f 1/08
U.S. Cl. 99—71                                          13 Claims

ABSTRACT OF THE DISCLOSURE

A process for improving the color and appearance of soluble coffee by coating frozen particles of coffee extract with a soluble coffee powder and then drying the coated particles, preferably by freeze-drying.

BACKGROUND OF THE INVENTION

This invention relates to an improved process for obtaining a darker colored soluble coffee having a more attractive granular appearance. The process can be applied to either freeze-dried soluble coffee or spray-dried soluble coffee. When used with a freeze-dried product, the process provides a simple technique for achieving a dark-colored product without the need of slowly freezing the extract prior to freeze-drying. When used on spray-dried soluble coffee, this technique can be used to achieve not only a darker color but a different particle appearance and, with some modification, a distinct flavor improvement.

SUMMARY OF THE INVENTION

It has now been discovered that an improved soluble coffee in regard to appearance and color is obtained by coating frozen particles of coffee extract with a soluble coffee powder and then drying the coated extract.

The amount of soluble coffee used in relation to the frozen coffee particles may vary over a wide range (from 5% to 85%) depending on the ultimate properties desired. When the aim is to modify a freeze-dried coffee, the level of spray-dried coating should be kept below 50%, preferably 10 to 35%. However, if the aim is a spray-dried coffee improvement, the level of spray-dried coffee can be increased to above 50%, say 60% to 75% by weight of the frozen particles.

DETAILED DESCRIPTION OF THE INVENTION

The aqueous coffee extract may be obtained in any suitable or convenient manner. The extract is quickly frozen to a temperature of below $-13°$ F. by use of extremely low temperatures, for example, by using liquid nitrogen or Freon.

The frozen coffee is then comminuted to desired particle size, while its temperature is maintained below $-13°$ F. A preferred particle size range is from below 12 mesh to above 100 mesh (U.S. Standard Sieve). Preferably, about 90% of the particles are retained on a 40 mesh screen. A suitable means of comminuting the frozen coffee is by grinding in an abrasion mill, but any other convenient comminuting means may be used.

The comminuted frozen coffee is then coated with soluble coffee having a particle size diameter not larger than about 300 microns, and preferably below about 200 microns. The soluble coffee may have been prepared in any convenient manner, and then ground and screeed to obtain material of the requisite particle size. The coating takes place under conditions such that the surface of the comminuted frozen coffee thaws, or liquifies while avoiding that degree of thawing which will cause the particles to coalesce or melt. This permits the spray-dried coffee powder to be adsorbed on the surface of the comminuted frozen coffee particles. Generally, the temperature of the particles during coating should not exceed about 5° F.

The coating may be carried out in the presence of an inert atmosphere such as, for example, nitrogen, carbon dioxide, helium, neon, argon or krypton. The coating may be carried out by any convenient means, such as, for example, by tumbling or blending. The amount of soluble coffee added will generally be in the range of from about 5–85% by weight of the comminuted frozen coffee, 10–35% when improving a normally freeze-dried coffee and 50–75% when improving a normally spray-dried product. The conditions will be varied to achieve the proper coating desired on the frozen particles of extract and are apparent. If only 10% of spray-dried powder is to be applied, a minimum of thawing is necessary during the coating operation while at levels of 80% spray-dried powder a significant thawing of the frozen particles will be required to achieve a uniform blend of dark, granular particles.

The coated particles, once formed, are then refrozen to below $-13°$ F. and preferably freeze-dried when modifying a freeze-dried product to a dark color. When modifying a spray-dried product, the coated particles of frozen extract may be simply air-dried, vacuum-dried, or if a flavor improvement is desired, freeze-dried. In the latter case, it is necessary to add any aroma source, be it oil or volatile aromas, to the extract portion which is frozen and then granulated.

The following example illustrates the present invention without, however, limiting the same thereto.

Example 1

A quantity of aqueous coffee extract is quick frozen with liquid nitrogen to a temperature below $-13°$ F. The frozen extract is then ground to a particle size such that it passes through a 12 mesh screen but is retained on a 40 mesh screen. The ground, frozen extract is then placed in a tumbler and 10% by weight of soluble coffe powder having a particle size below 200 microns and a temperature of $-13°$ F. are added. The temperature is raised to 0–5° F. during tumbling to partially thaw the ground, frozen extract thereby enabling the soluble coffee powder to coat the surface thereof. When all of the powder has been absorbed on the surface of the ground, frozen extract, the coated extract particles are quickly frozen to reduce their temperature to $-13°$ F. The coated extract particles are then freeze-dried. The freeze-dried particles are darker than conventional soluble coffee and approach the color of fresh roasted and ground coffee.

While the present invention has been described in detail, it will be understood by those skilled in the art that variations and modifications may be made without departing from the spirit thereof or the scope of the following claims.

What is claimed is:

1. A process for producing soluble coffee of improved color and appearance comprising freezing an aqueous coffee extract, coating the frozen extract in a partially thawed state with 5–85% by weight based on the frozen extract of soluble coffee powder, refreezing the coated extract, and drying the coated extract.

2. The process of claim 1, wherein the aqueous coffee extract is frozen to a temperature below $-13°$ F.

3. The process of claim 1, wherein the aqueous coffee extract is refrozen after coating to below $-13°$ F.

4. The process of claim 1, wherein the coating of the partially thawed frozen extract is done at a temperature not above 5° F.

5. A method according to claim 1 wherein the frozen coffee extract is ground to a particle size below 12 mesh U.S. Sieve Series before being coated with soluble coffee powder.

6. The process of claim 1 wherein the soluble coffee powder is spray-dried coffee, employed at a level of 50–75% by weight based on the coated frozen extract.

7. The process of claim 6 wherein the coated particles are air-dried.

8. The process of claim 6 wherein the coated particles are vacuum-dried.

9. The process of claim 6 wherein the coated particles are freeze-dried after having aromas added to the extract which is frozen and granulated prior to the coating operation.

10. A method according to claim 1 wherein the soluble coffee powder has a particle size below 200 microns.

11. The process of claim 1 wherein the soluble coffee powder is free-dried coffee, employed at a level of less than 50% by weight based on the coated frozen extract.

12. The process of claim 11 wherein the freeze-dried coffee is employed at a level of 10 to 35%.

13. Freeze-dried coffee having a particle size below 12 mesh and above 100 mesh U.S. Sieve Series, and prepared from coating about 5–85% by weight based on the coated frozen extract, spray-dried coffee powder having a particle size below 200 microns on a frozen aqueous coffee extract, prior to freeze drying.

References Cited

UNITED STATES PATENTS

| | | | |
|---|---|---|---|
| 2,224,942 | 12/1940 | Weisman | 99—167 |
| 2,949,364 | 8/1960 | Bilenker | 99—71 |
| 3,244,533 | 4/1966 | Clinton et al. | 99—71 |
| 3,261,689 | 7/1966 | Ponzoni | 99—71 |
| 3,309,779 | 3/1967 | Ginnette et al. | 34—5 |
| 3,419,399 | 12/1968 | Earle, Jr., et al. | 99—71 |

FOREIGN PATENTS

| | | | |
|---|---|---|---|
| 723,129 | 12/1965 | Canada | 99—71 |
| 1,102,587 | 2/1968 | Great Britain | 99—71 |

DENNIS E. TALBERT, Jr., Primary Examiner

U.S. Cl. X.R.

34—5; 99—199